United States Patent
Yampolskiy et al.

(10) Patent No.: US 11,140,192 B2
(45) Date of Patent: *Oct. 5, 2021

(54) ENTITY IP MAPPING

(71) Applicant: SecurityScorecard, Inc., New York, NY (US)

(72) Inventors: Aleksandr Yampolskiy, Brooklyn, NY (US); Rob Blackin, East Brunswick, NJ (US); Samuel Kassoumeh, New York, NY (US); Nick Matviko, Brooklyn, NY (US)

(73) Assignee: SecurityScorecard, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,452

(22) Filed: Dec. 20, 2019

(65) Prior Publication Data

US 2020/0137106 A1    Apr. 30, 2020

Related U.S. Application Data

(63) Continuation of application No. 16/299,040, filed on Mar. 11, 2019, now Pat. No. 10,560,474, which is a
(Continued)

(51) Int. Cl.
| | |
|---|---|
| *G06F 15/16* | (2006.01) |
| *H04L 29/06* | (2006.01) |
| *G06F 21/57* | (2013.01) |
| *H04L 29/08* | (2006.01) |
| *H04L 29/12* | (2006.01) |

(Continued)

(52) U.S. Cl.
CPC .......... *H04L 63/1433* (2013.01); *G06F 21/56* (2013.01); *G06F 21/57* (2013.01);
(Continued)

(58) Field of Classification Search
CPC ........... H04L 63/1433; H04L 29/12066; H04L 43/065; H04L 61/1511; H04L 61/2007;
(Continued)

(56) References Cited

U.S. PATENT DOCUMENTS

| | | | |
|---|---|---|---|
| 5,917,997 A * | 6/1999 | Bell | .................. H04L 29/12009 709/238 |
| 6,601,093 B1 | 7/2003 | Peters | |

(Continued)

*Primary Examiner* — Kaylee J Huang
(74) *Attorney, Agent, or Firm* — Norton Rose Fulbright US LLP

(57) ABSTRACT

Systems and methods for mapping IP addresses to an entity include receiving at least one domain name associated with the entity. Embodiments may further include determining one or more variations of the at least one domain name based on analysis of domain name data collected from a plurality of domain name data sources that mention a variation of the at least one domain name. Some embodiments may also include identifying one or more IP addresses pointed to by the one or more variations of the entity's domain name based on analysis of IP address data collected from a plurality of IP address data sources. Additional embodiments include assigning weights to each of the identified one or more IP addresses and creating a mapping of IP addresses to associate with the entity based on analysis of the weighted one or more IP addresses.

20 Claims, 5 Drawing Sheets

Related U.S. Application Data continuation of application No. 15/443,700, filed on Feb. 27, 2017, now Pat. No. 10,230,753, which is a continuation of application No. 14/702,667, filed on May 1, 2015, now Pat. No. 9,641,547.

(60) Provisional application No. 62/091,477, filed on Dec. 13, 2014, provisional application No. 62/091,478, filed on Dec. 13, 2014.

(51) Int. Cl.
| | |
|---|---|
| *G06N 20/00* | (2019.01) |
| *H04L 12/26* | (2006.01) |
| *G06Q 10/06* | (2012.01) |
| *G06F 21/56* | (2013.01) |
| *H04W 84/12* | (2009.01) |

(52) U.S. Cl.
CPC ........... *G06F 21/577* (2013.01); *G06N 20/00* (2019.01); *G06Q 10/0635* (2013.01); *G06Q 10/06393* (2013.01); *H04L 29/12066* (2013.01); *H04L 43/065* (2013.01); *H04L 61/1511* (2013.01); *H04L 61/2007* (2013.01); *H04L 61/2076* (2013.01); *H04L 61/25* (2013.01); *H04L 61/2503* (2013.01); *H04L 63/08* (2013.01); *H04L 63/1425* (2013.01); *H04L 63/1458* (2013.01); *H04L 67/10* (2013.01); *H04W 84/12* (2013.01); *G06F 2221/034* (2013.01)

(58) Field of Classification Search
CPC . H04L 61/25; H04L 61/2076; H04L 61/2503; H04L 63/08; H04L 63/1425; H04L 63/1458; H04L 67/10; G06Q 10/0635; G06Q 10/06393

USPC .......................................... 709/245, 203, 219
See application file for complete search history.

(56) References Cited

U.S. PATENT DOCUMENTS

| | | | |
|---|---|---|---|
| 7,178,166 B1 | | 2/2007 | Taylor et al. |
| 7,237,264 B1 | | 6/2007 | Graham et al. |
| 7,574,740 B1 | | 8/2009 | Kennis |
| 7,634,800 B2 | | 12/2009 | Ide et al. |
| 7,913,303 B1 | | 3/2011 | Rouland et al. |
| 7,934,254 B2 | | 4/2011 | Graham |
| 8,825,662 B1 | | 9/2014 | Kingman et al. |
| 9,509,764 B1 | * | 11/2016 | Kolam ................ H04L 67/2852 |
| 2004/0073707 A1 | * | 4/2004 | Dillon ............... H04L 29/12066 709/245 |
| 2005/0286518 A1 | | 12/2005 | Park et al. |
| 2011/0035437 A1 | | 2/2011 | Toumura |
| 2011/0270964 A1 | * | 11/2011 | Huang ................ H04L 43/0864 709/224 |
| 2011/0282988 A1 | * | 11/2011 | Wang ..................... H04L 41/12 709/224 |
| 2013/0173791 A1 | | 7/2013 | Longo |
| 2013/0203023 A1 | | 8/2013 | Sadeh-Koniecpol et al. |
| 2013/0204997 A1 | * | 8/2013 | Eggleston ........... H04L 43/0882 709/223 |
| 2013/0311677 A1 | * | 11/2013 | Coulson ............. H04L 61/1511 709/245 |
| 2014/0098955 A1 | | 4/2014 | Hughes et al. |
| 2014/0189860 A1 | | 7/2014 | Hull Roskos |
| 2014/0199663 A1 | | 7/2014 | Sadeh-Koniecpol et al. |
| 2014/0199664 A1 | | 7/2014 | Sadeh-Koniecpol et al. |
| 2015/0074579 A1 | | 3/2015 | Gladstone et al. |

* cited by examiner

ENTITY IP MAPPING

CROSS-REFERENCE TO RELATED APPLICATIONS

The present application is a continuation of U.S. patent application Ser. No. 16/299,040 filed Mar. 11, 2019, and entitled "ENTITY IP MAPPING", which is a continuation of U.S. patent application Ser. No. 15/443,700 filed Feb. 27, 2017, issued Mar. 12, 2019, as U.S. Pat. No. 10,230,753, and entitled "ENTITY IP MAPPING", which is a continuation of U.S. patent application Ser. No. 14/702,667 filed May 1, 2015, issued May 2, 2017, as U.S. Pat. No. 9,641,547, and entitled "ENTITY IP MAPPING", which claims priority to U.S. Provisional Patent Application No. 62/091,477 entitled "CORPORATE IP ADDRESS DISCOVERY THROUGH SUBSIDIARY AND INTERNAL SYSTEM MAPPING SYSTEM AND METHOD," filed on Dec. 13, 2014, and also claims priority to U.S. Provisional Patent Application No. 62/091,478 entitled "CORPORATE CYBER SECURITY BENCHMARKING AS A SERVICE SYSTEM AND METHOD," filed on Dec. 13, 2014, the disclosures of which are incorporated herein by reference in their entirety.

FIELD OF THE DISCLOSURE

This disclosure generally relates to corporate cybersecurity technology. More specifically, this disclosure relates to mapping Internet Protocol (IP) addresses to an entity to assist in benchmarking the entity's cybersecurity risk.

BACKGROUND

An entity, such as an organization, corporation, or governmental entity, may have a number of IP addresses allocated to it through which computers may be used for internal and external communication. For some entities, employees at different locations may communicate with each other using different network service providers, such as Internet Service Providers (ISPs). Some entities may also be accessed using third-party hosting providers and virtualized cloud services, which often assign part of their own allocated IP addresses to the entity instead of one of the IP addresses already allocated to the entity. As a result, an entity may not know each of the different IP addresses through which employees and computers of the entity communicate.

SUMMARY

A scorecard system may create a mapping of IP addresses that are associated with an entity to improve accuracy in the calculation of the entity's cybersecurity risk. For example, according to one embodiment, a method for mapping IP addresses to an entity may include receiving, by a processor, at least one domain name associated with the entity. The method may also include determining, by the processor, one or more variations of the at least one domain name based on analysis of domain name data collected from a plurality of domain name data sources that mention a variation of the at least one domain name. The method may further include identifying, by the processor, one or more IP addresses pointed to by the one or more variations of the entity's domain name based on analysis of IP address data collected from a plurality of IP address data sources. The method may also include assigning, by the processor, a weight to each of the identified one or more IP addresses based on a correlation between each of the identified one or more IP addresses and the one or more variations of the at least one domain name. The method may further include creating, by the processor, a mapping of IP addresses to associate with the entity based on analysis of the weighted one or more IP addresses.

According to another embodiment, a computer program product includes a non-transitory computer-readable medium comprising instructions which, when executed by a processor of a computing system, cause the processor to perform the step of receiving at least one domain name associated with the entity. The medium may also include instructions which cause the processor to perform the step of determining one or more variations of the at least one domain name based on analysis of domain name data collected from a plurality of domain name data sources that mention a variation of the at least one domain name. The medium may further include instructions which cause the processor to perform the step of identifying one or more IP addresses pointed to by the one or more variations of the entity's domain name based on analysis of IP address data collected from a plurality of IP address data sources. The medium may also include instructions which cause the processor to perform the step of assigning a weight to each of the identified one or more IP addresses based on a correlation between each of the identified one or more IP addresses and the one or more variations of the at least one domain name. The medium may further include instructions which cause the processor to perform the step of creating a mapping of IP addresses to associate with the entity based on analysis of the weighted one or more IP addresses.

According to yet another embodiment, an apparatus includes a memory and a processor coupled to the memory. The processor can be configured to execute the step of receiving at least one domain name associated with the entity. The processor may also be configured to execute the step of determining one or more variations of the at least one domain name based on analysis of domain name data collected from a plurality of domain name data sources that mention a variation of the at least one domain name. The processor can be configured to execute the step of identifying one or more IP addresses pointed to by the one or more variations of the entity's domain name based on analysis of IP address data collected from a plurality of IP address data sources. The processor may also be configured to execute the step of assigning a weight to each of the identified one or more IP addresses based on a correlation between each of the identified one or more IP addresses and the one or more variations of the at least one domain name. The processor can be configured to execute the step of creating a mapping of IP addresses to associate with the entity based on analysis of the weighted one or more IP addresses.

The foregoing has outlined rather broadly the features and technical advantages of the present invention in order that the detailed description of the invention that follows can be better understood. Additional features and advantages of the invention will be described hereinafter that form the subject of the claims of the invention. It should be appreciated by those skilled in the art that the concepts and specific embodiments disclosed can be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosure, reference is made to the following FIGURES taken in conjunction with their accompanying descriptions.

DETAILED DESCRIPTION

Figure 1:
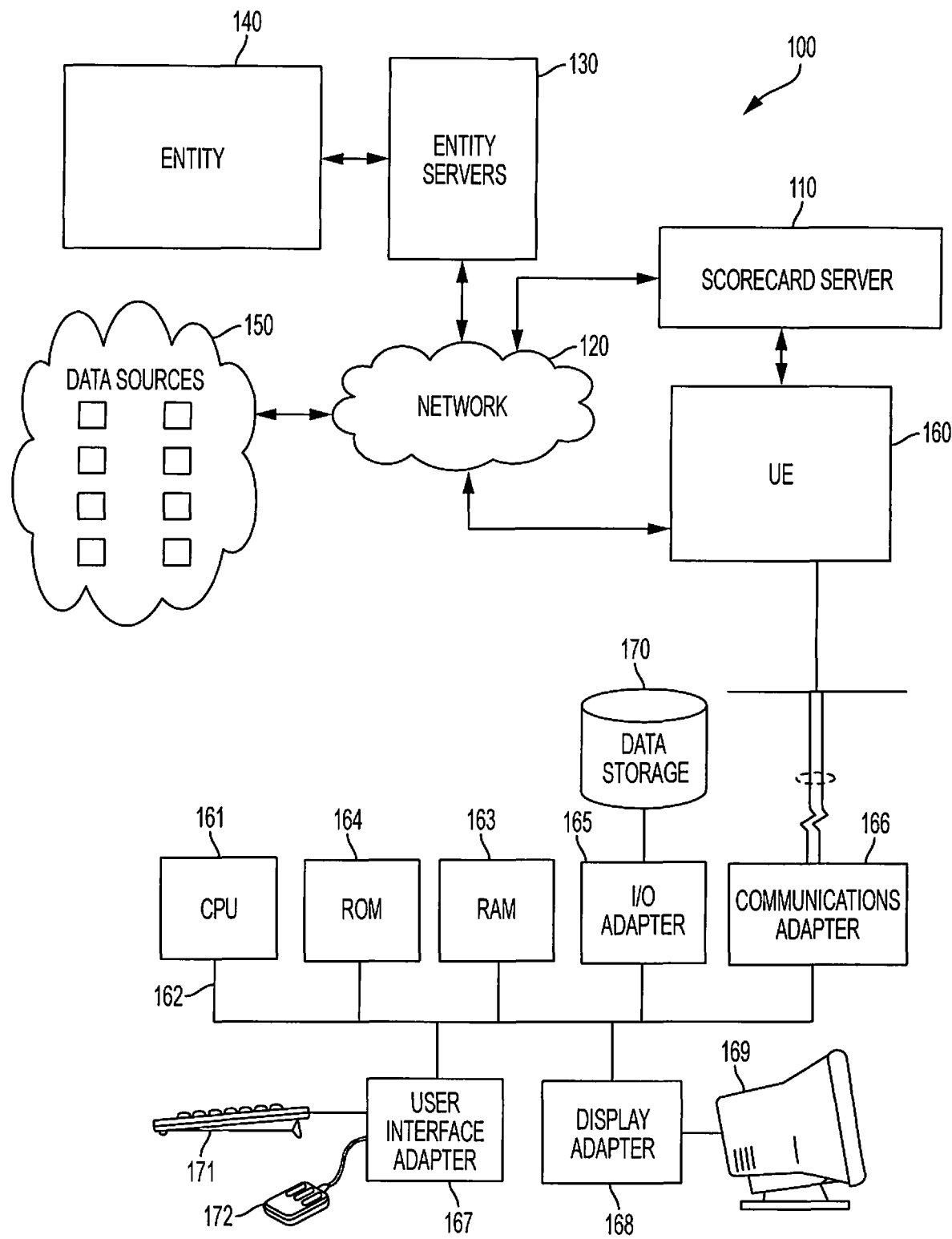
FIG. 1 is a block diagram of a network that includes a scorecard server, data sources, and an entity with a cybersecurity risk according to an embodiment.
Figure 2:
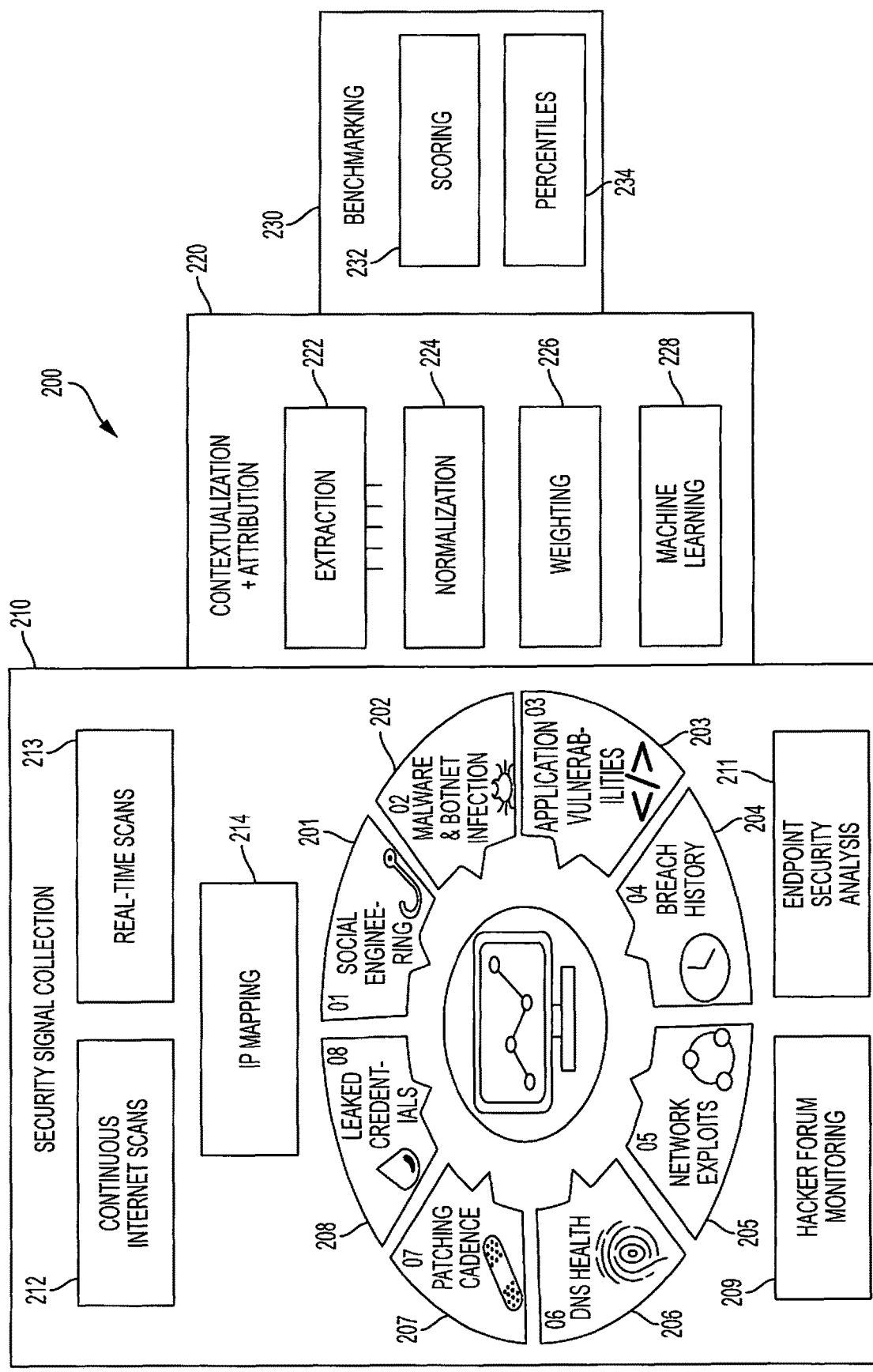
FIG. 2 is a block diagram of a system for calculating and benchmarking an entity's cybersecurity risk according to an embodiment.

The IP addresses associated with an entity, including IP addresses associated with subsidiary and/or internal systems of the entity, may be determined based solely from knowledge of a domain name of an entity. Knowledge of the IP addresses associated with an entity may be useful for a variety of applications. For example, as illustrated in FIGS. 1-2, a mapping of the IP addresses associated with an entity may be used to determine a cybersecurity risk for an entity.

An IP address, as used herein, is a numerical label assigned to a device, such as a computer or printer, participating in a computer network that uses the Internet Protocol for communication. An IP address primarily serves two principal functions: (1) identification of a host or network interface, and (2) location addressing. IP addresses are typically binary numbers that are usually stored in text files and displayed in human-readable notations, such as 172.16.254.1 (for IPv4), and 2001:db8:0:1234:0:567:8:1 (for IPv6).

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module comprises a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram of network 100 that includes a scorecard server 110, a communication network 120, an entity server 130, an entity 140, data sources 150, and user station 160. The scorecard server 110 includes one or more servers that, according to one embodiment, are configured to perform several of the functions described herein. One or more of the servers comprising the scorecard server 110 include memory, storage hardware, software residing thereon, and one or more processors configured to perform functions associated with network 100. For example, components comprising user station 160, such as CPU 162, can be used to interface and/or implement scorecard server 110. One of skill in the art will readily recognize that different server and computer architectures can be utilized to implement scorecard server 110 and that scorecard server 110 is not limited to a particular architecture so long as the hardware implementing scorecard server 110 supports the functions of the scorecard system disclosed herein.

The communication network 120 facilitates communications of data between the scorecard server 110 and the data sources 150. The communication network 120 can also facilitate communications of data between the scorecard server 110 and other servers/processors, such as entity server 130. The communication network 120 includes any type of communications network, such as a direct PC-to-PC connection, a local area network (LAN), a wide area network (WAN), a modem-to-modem connection, the Internet, a combination of the above, or any other communications network now known or later developed within the networking arts which permits two or more computers to communicate.

The entity server 130 includes the servers which the entity 140 uses to support its operations and which the scorecard server 110 accesses to collect further information to calculate and benchmark an entity's cybersecurity risk. The data sources 150 include the sources from which the scorecard server 110 collects information to calculate and benchmark an entity's cybersecurity risk.

The Entity 140 includes any organization, company, corporation, or group of individuals. For example, and not limitation, one entity may be a corporation with thousands of employees and headquarters in New York City, while another entity may be a group of one or more individuals associated with a website and having headquarters in a residential home.

Data Sources 150 includes any source of data accessible over Network 120. For example, and not limitation, one source of data can include a website associated with a company, while another source of data may be an online database of various information. In general, the data sources 150 may be sources of any kind of data, such as domain name data, social media data, multimedia data, IP address data, and the like. One of skill in the art would readily recognize that data sources 150 are not limited to a particular data source, and that any source from which data may be retrieved may serve as a data source so long as it can be accessed by network 120.

With respect to user station 160, the central processing unit ("CPU") 161 is coupled to the system bus 162. The CPU 161 can be a general purpose CPU or microprocessor performing the functions of the scorecard server 110, a graphics processing unit ("GPU"), and/or microcontroller. Embodiments are not restricted by the architecture of the CPU 161 so long as the CPU 161, whether directly or indirectly, supports the operations described herein. The CPU 161 is one component may execute the various described logical instructions.

The user station 160 also comprises random access memory (RAM) 163, which can be synchronous RAM (SRAM), dynamic RAM (DRAM), synchronous dynamic RAM (SDRAM), or the like. The user station 160 may utilize RAM 163 to store the various data structures used by a software application. The user station 160 also comprises read only memory (ROM) 164 which can be PROM, EPROM, EEPROM, optical storage, or the like. The ROM may store configuration information for booting the user station 160. The RAM 163 and the ROM 164 hold user and system data, and both the RAM 163 and the ROM 164 can be randomly accessed.

The user station 160 also comprises an input/output (I/O) adapter 165, a communications adapter 166, a user interface adapter 167, and a display adapter 168. The I/O adapter 165 and/or the user interface adapter 167 may, in certain embodiments, enable a user to interact with the user station 160. In a further embodiment, the display adapter 168 may display a graphical user interface (GUI) associated with a software or web-based application on a display device 169, such as a monitor or touch screen.

The I/O adapter 165 may couple one or more storage devices 170, such as one or more of a hard drive, a solid state storage device, a flash drive, a compact disc (CD) drive, a floppy disk drive, and a tape drive, to the user station 160. Also, the data storage 170 can be a separate server coupled to the user station 160 through a network connection to the I/O adapter 165. The communications adapter 166 can be adapted to couple the user station 160 to a network, which can be one or more of a LAN, WAN, and/or the Internet. The user interface adapter 167 couples user input devices, such as a keyboard 171, a pointing device 172, and/or a touch screen (not shown) to the user station 160. The display adapter 168 can be driven by the CPU 161 to control the display on the display device 169. Any of the devices 161-168 can be physical and/or logical.

The concepts described herein are not limited to the architecture of user station 160. Rather, the user station 160 is provided as an example of one type of computing device that can be adapted to perform the functions of a server and/or the user interface device 165. For example, any suitable processor-based device can be utilized including, without limitation, personal data assistants (PDAs), tablet computers, smartphones, computer game consoles, and multi-processor servers. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

It should be appreciated that user station 160, or certain components thereof, may reside at, or be installed in, different locations within network 100. According to the illustrated embodiment, user station 160 directly interfaces with scorecard server 110. Such an embodiment is conducive for an individual or user not directly associated with entity 140 to effectuate computation of a cybersecurity risk and/or benchmark of same for that entity. However, in other embodiments, one or more users located at entity 140 or locations directly associated with same, may effectuate computation of a cybersecurity risk and/or benchmark of same for that entity. In such an embodiment, user station 160 (or at least certain components thereof) may directly interface with entity servers 130. Likewise, entity servers 130 may comprise the hardware and/or software found in scorecard server 110 in the illustrated embodiment. Importantly, the features necessary to compute cybersecurity risk scores and benchmarks can be collocated within network 100 or distributed across, e.g., scorecard server 110 and entity servers 130, and user station(s) 160.

FIG. 2 is a block diagram of a system for calculating and benchmarking an entity's cybersecurity risk according to an embodiment. Such a system is described in detail in co-owned application Ser. No. 15/333,099 filed Oct. 24, 2016, issued as U.S. Pat. No. 10,498,756 on Dec. 3, 2019, entitled "CALCULATING AND BENCHMARKING AN ENTITY'S CYBERSECURITY RISK SCORE," the disclosure of which is incorporated herein by reference in its entirety. System 200 can be implemented with one or more computing devices, such as scorecard server 110, entity servers 130, and user station(s) 160 illustrated in FIG. 1. System 200 comprises a security signal collection module 210, a contextualization and attribution module 220, and a benchmarking module 230.

Security signal collection module 210 collects one or more types of data that relate to the cybersecurity risks associated with an entity. Security signal collection module 210 comprises submodules that collect different types of data from a predefined "threat sphere." The threat sphere may change depending on the entity for which a cybersecurity risk score is calculated, and may further change according to the goals and/or objectives of the entity. In any event, the threat sphere is typically defined to include sources of information that likely comprise, generate, are responsible for, or otherwise correspond to data indicative of an entity's cybersecurity risk. Accordingly, each module or submodule that collects data corresponds to one more channels or data feeds from sources comprising the threat sphere.

According to the illustrated embodiment, security signal collection module 210 comprises a social engineering collection module 201, a malware and botnet infection collection module 202, an application vulnerabilities collection module 203, a breach history collection module 204, a network exploits collection module 205, a DNS Health collection module 206, a patching cadence collection module 207, and a leaked credentials collection module 208.

Security signal collection module 210 can also comprises a hacker forum monitoring module 209 for collecting data from hacker forums can also and an endpoint security analysis module 211 for collecting endpoint data.

Security signal collection module 210 can also comprises modules for specifying when data is collected and how data is associated with an entity. For example, the security signal collection module 210 comprises a continuous Internet scans module 212 for performing continuous scans of Internet data to collect data associated with an entity. The security signal collection module 210 can also comprises a real-time scans collection module 213 for collecting data in real time, such as collecting real-time threat intelligence/data and collecting data in real time from a malicious IP feed, which can include digesting 2000+ bad (IPS) per second. The security signal collection module 210 can also comprises an IP Mapping module 214 to reliably identify IP addresses associated with an entity. By mapping IP addresses to an entity, data collected the Internet over one or more channels comprising the threat sphere (or beyond) can be determined to be associated with, or attributable to, the given entity.

Contextualization and attribution module 220 contextualizes data collected by the security signal collection module 210. The contextualization and attribution module 220 comprises an extraction module 222 to extract data relevant to cybersecurity of a given entity from the collected data. The contextualization and attribution module 220 can also comprises a normalization module 224 and a weighting module 226 to normalize and/or weight a preliminary security score determined based on a raw scoring of the extracted security data. The normalization and/or weighting of a preliminary score may depend on multiple factors, such as, for example, the size of the entity, the relationship between the extracted information and overall security performance, and the type of data collected.

The contextualization and attribution module 220 can also comprises a machine learning module 228 to identify and update which factors most significantly affect an entity's cybersecurity. This information can be used to further contextualize the collected data. For example, the security scores identified as being the most relevant may then be normalized and/or weighted to account for their relevancy. The contextualization process can also comprises applying temporal adjustments to security data or calculated security scores based on the time span between an event that generated the security data and the current date. In some embodiments, contextualization can also comprises validating threats, such as, for example, by confirming that an event creating data that indicates the presence of a malware event is in fact a malware event. Further aspects of the contextualization submodules are described in detail below.

Benchmarking module 230 calculates an overall cybersecurity risk score for an entity, as well as a benchmark based on cybersecurity performance metrics. The computed benchmark may further comprise a percentile ranking for the entity. For example, the benchmarking module 230 comprises a scoring module 232 to obtain the overall cybersecurity risk score for an entity based on the contextualization of the entity's security data and processing of scores for each of the different types of security data collected for the entity.

The benchmarking module 230 can also comprises a percentiles module 234 to determine a percentile ranking for the entity which provides an indication of how the entity's cybersecurity fairs with respect to similar companies in the same industry. Further aspects of the benchmarking submodules are described in detail below. A scorecard server, such as scorecard server 100 from FIG. 1, may utilize one or more of the submodules in the security signal collection 210, contextualization 220, and benchmarking 230 modules to score and benchmark an entity's cybersecurity risk.

Figure 2B:
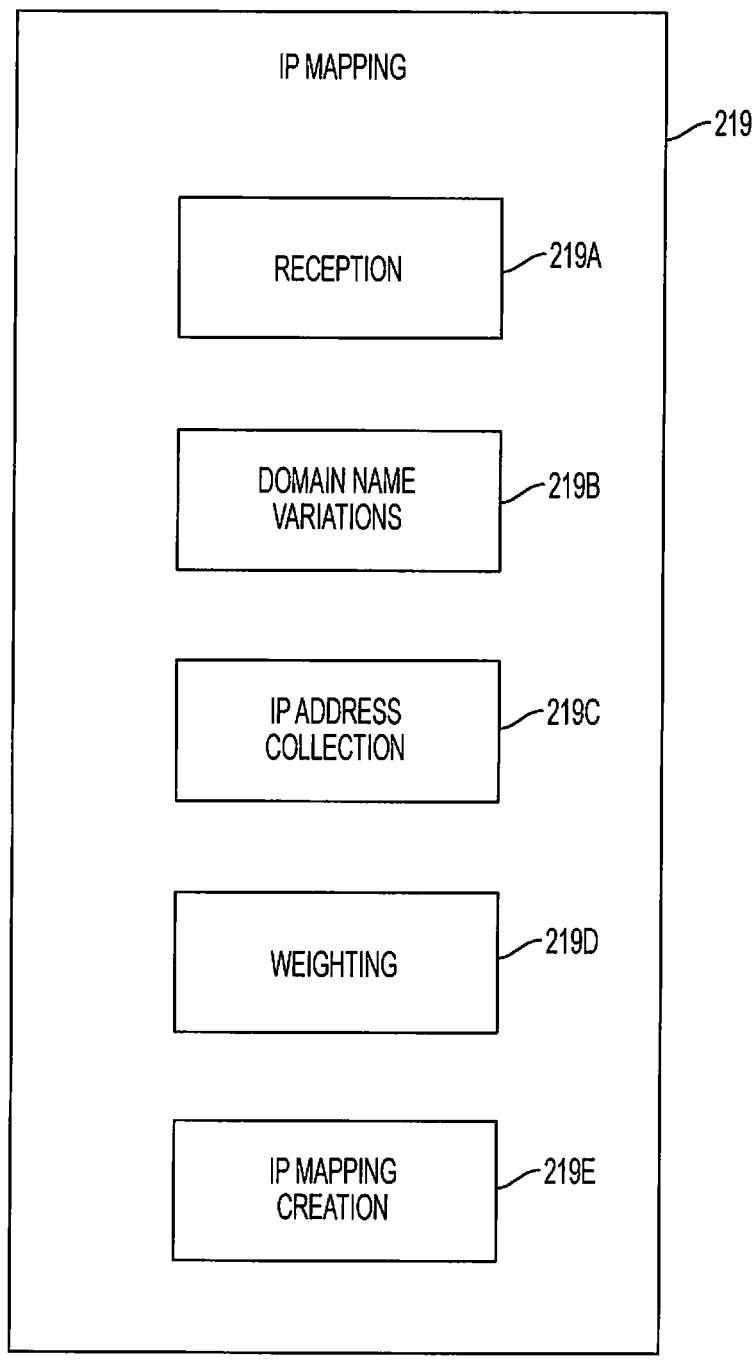
FIG. 2B is a block diagram of underlying components of a system for mapping IP addresses to an entity according to an embodiment.
Figure 3:
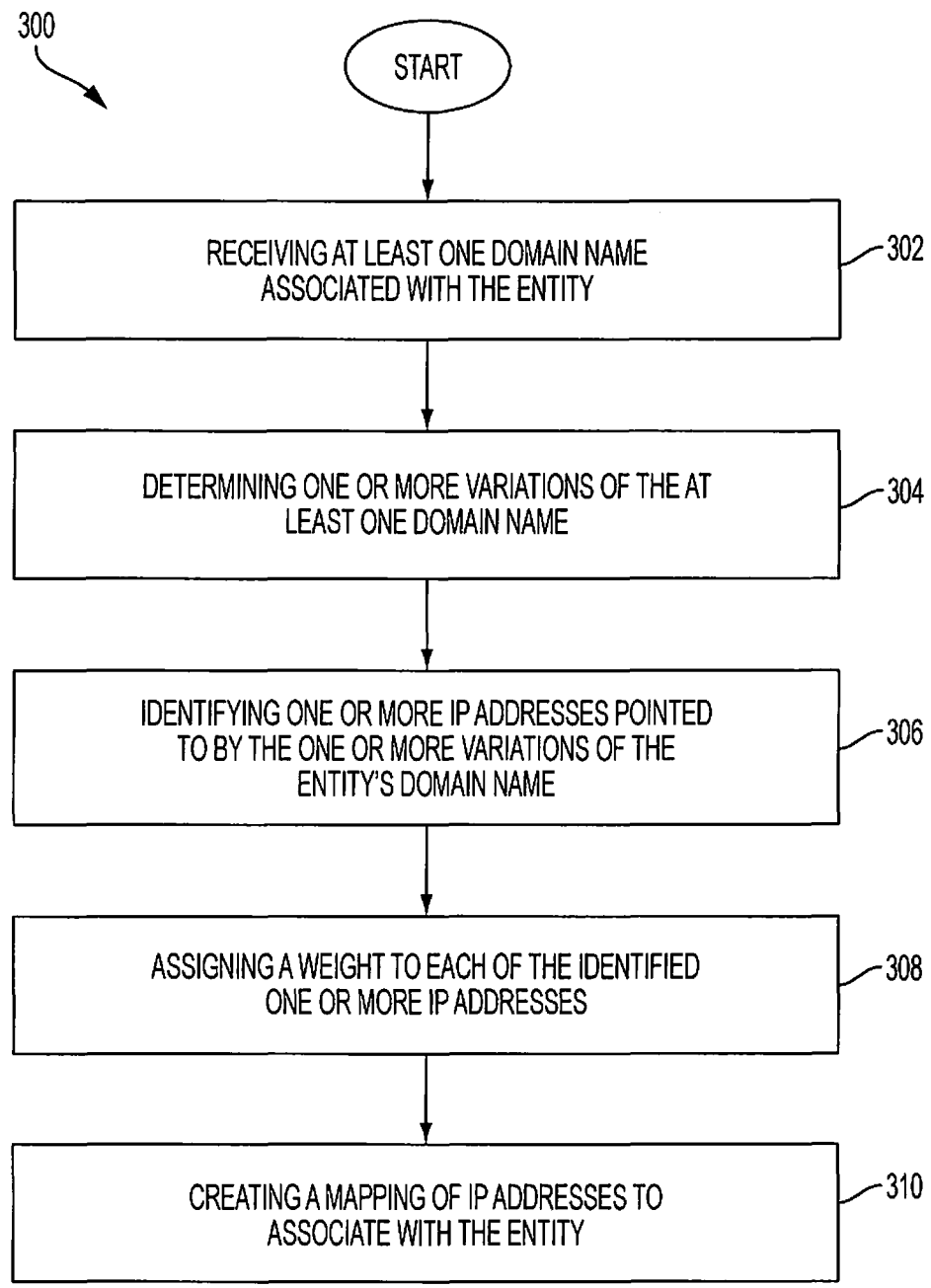
FIG. 3 is a flow chart of a method for mapping IP addresses to an entity according to an embodiment.

As is apparent from FIG. 1 and FIG. 2, a mapping of the IP addresses associated with an entity may be useful to improve the accuracy with which a scorecard system calculates a cybersecurity score for an entity. FIG. 2B is a block diagram of underlying components of a system for mapping IP addresses to an entity, and FIG. 3 is a flow chart illustrating a method for mapping IP addresses to an entity using the underlying components of the system for mapping IP addresses to an entity. It is noted that embodiments of method 300 can be implemented with the systems described with respect to FIGS. 1-2, in particular the underlying components illustrated in FIG. 2B. For example, a processor disclosed in method 300 may correspond to a processor within a scorecard server disclosed in this disclosure. Specifically, method 300 includes, at block 302, receiving at least one domain name associated with the entity. For example, scorecard system 200 can implement reception module 219A to receive a URL associated with an entity. The URL may include the domain name for the entity. The URL, and in particular the domain name, may be input by a user accessing scorecard system 200, for example, a user accessing scorecard system 200 via user station 160 illustrated in FIG. 1.

At block 304, method 300 includes determining one or more variations of the at least one domain name. For example, scorecard system 200 can implement domain name variations module 219B to determine one or more variations of a received domain name. In some embodiments, determination of the variations of the domain name may be based on analysis of domain name data collected from a plurality of domain name data sources that mention a variation of the domain name. As noted with respect to FIG. 1, data sources 150 from which domain name data may be gathered include any sources of data which include information about the domain names used or mentioned in the data source. Examples, and not limitations, of data sources include databases, such as Freebase™ and CrunchBase©, online services, such as LinkedIn©, and general informational websites, such as CNN.com. For example, given a domain "gs.com," scorecard system 200 may collect domain name data from multiple data sources across the Internet. The scorecard system 200 may analyze the domain name data collected from the data sources to determine one or more variations of the domain name, such as "gs.com" and "goldmansachs.com." In general, the domain name data may also include general mentions of an entity in a data source. For example, given a domain "gs.com," domain name variations may also include "Goldman Sachs, Inc." and "The Goldman Sachs," each of which may point to IP addresses. The information collected from all the data sources may be correlated to determine the most accurate variations of the domain names associated with an entity. For example, a machine learning algorithm may be developed to correlate the domain name data collected from all the data sources to determine the most accurate variations of the domain names associated with the entity. In some embodiments, the scorecard system 200 may also suffix or append characters to an identified domain name to aid in the determination of the domain name variations.

At block 306, method 300 includes identifying one or more IP addresses pointed to by the one or more variations of the entity's domain name. For example, scorecard system 200 can implement IP address collection module 219C to identify IP addresses pointed to by domain name data. In some embodiments, identification of the one or more IP addresses may be based on analysis of IP address data collected from a plurality of IP address data sources. Examples, and not limitations, of data sources from which IP addresses may be collected include IP registries, such as the American Registry for Internet Numbers (ARIN), the European IP Networks (RIPE), the Latin America and Caribbean Network Information Centre (LACNIC), the African Network Information Center (AFRINIC), and the Asia-Pacific Network Information Centre (APNIC). Other data sources include third-party IP address databases. In some embodiments, the scorecard system 200 may also analyze data in Domain Name System (DNS) records, Border Gateway Protocol (BGP) records, Secure Socket Layer (SSL) certificates, security scanners, such as Nmap, content delivery network (CDN) databases, and known security IP addresses, such as honeypots and sinkholes owned by security companies. From analysis of data collected from the data sources, the scorecard system can identify the IP addresses pointed to by the different variations of the entity's domain name.

At block 308, method 300 includes assigning, by the processor, a weight to each of the identified one or more IP addresses. For example, scorecard system 200 can implement IP weighting module 219D to weigh the identified IP addresses. In some embodiments, weighting may be based on a correlation between each of the identified one or more IP addresses and the one or more variations of the at least one domain name. In one embodiment, a good correlation may consist of an IP address that is pointed to by multiple variations of the domain name data. In other words, weighting may include assigning a larger weight to an IP address of the identified one or more IP addresses that maps to multiple of the one or more variations of the at least one domain name than the weight assigned to an IP address of the identified one or more IP addresses that maps to only one of the one or more variations of the at least one domain name. For example, in one embodiment, a mapping Ci may consist of a single mapping between an IP address and a domain name data variation. For multiple mappings, such as C1, C2, . . . , Cn, the number of times an IP address maps to a different variation of the domain name data may be tracked. Based on the number of times an IP address maps to a different variation of the domain name data for an entity, a weight between 0 and 1 can be assigned to the IP address. A higher weight may be assigned to IP addresses pointed to multiple times than IP addresses pointed to once.

Weighting with weighting module 219D may also include weighting based on the reliability of the domain name variation determined for an entity. For example, if the scorecard system 200 had to perform truncation or appending to obtain the domain name variation or if the domain name variation is mentioned only once in only a single data source, then the scorecard system 200 may assign a lower weight to the IP address pointed to by the domain name variation. In other words, a good indication that an IP address is associated with an entity is that multiple variations for the entity's domain name point to the same IP address. In contrast, if the domain name pointing to an IP address is mentioned in numerous databases in association with the company or if the domain name variation is one specifically provided by an employee of the company, then the scorecard system 200 may assign a larger weight to the IP address. In another embodiment, weighing with weighting module 219D may also include weighting based on the specific type of entity network with which the collected IP addresses are associated. For example, an IP address associated with a guest network or WiFi network of the entity may be assigned a lower weight than an IP address associated with an intranet network of the entity.

The scorecard system 200 may also include a machine learning algorithm to perform the weighting disclosed herein. For example, the scorecard system 200 may utilize a machine learning algorithm to, in addition to implement the other weighting routines disclosed above, analyze anonymized fingerprints of browsers when analyzing IP addresses obtained from online advertisements or e-mails. One of skill in the art would readily recognize that the machine learning algorithm is not limited to implementing only the weighting factors disclosed herein, and that many other factors may be incorporated into the machine learning algorithm so long as the machine learning algorithm utilizes the factors to weight the IP addresses association with domain name variations of an entity.

At block 310, method 300 includes creating a mapping of IP addresses to associate with the entity based on analysis of the weighted one or more IP addresses. For example, scorecard system 200 can implement IP mapping creation module 219E to create the mapping. In particular, the scorecard system 200 may create the IP mapping by selecting only the IP addresses that are most reliably associated with the entity for inclusion into the IP mapping. For example, in one embodiment, the scorecard system 200 may set a minimum weight threshold for IP addresses to be included in the created IP mapping. IP addresses with weights higher than then minimum threshold, for example IP addresses pointed to by domain name variations mentioned in numerous databases in association with the company or specifically provided by an employee of the company, may be included in the created IP mapping. IP addresses with weights below the minimum threshold, for example IP addresses pointed to by unreliable domain name variations, may be excluded from inclusion in the created IP mapping. In some embodiments, the created mapping of IP addresses may be adjusted or maintained up-to-date by periodically executing the reception 219A, domain name variations 219B, IP address collection 219C, weighting 219D, and IP mapping creation 219E modules as disclosed herein.

The IP mapping for an entity, such as the IP mapping created at block 310 using IP mapping creation module 219E, may be adjusted for a variety of reasons. For example, in one embodiment, a representative of an entity may provide specific IP addresses for inclusion in the IP mapping for the entity or the representative of the entity may specify which IP addresses in the created IP mapping should not be included in the IP mapping. In other words, the scorecard system 200 adjusts the created mapping of IP addresses based on user input. In some embodiments, the representative may input the IP addresses to include or exclude by accessing the scorecard system 200 via user station 160. The scorecard system may then modify the IP mapping based on the information provided by the entity representative. In some embodiments, the scorecard system 200 may also exclude from the IP mapping IP addresses associated with networks other than the entity network, such as a Wi-Fi, third-party hosting, guest, or security network. The scorecard system 200 may associate IP addresses with the other networks based on user input provided on user station 160. The scorecard system may also associate IP addresses to the other networks based on the weighting performed by weighting module 219D. For example, the machine learning algorithm utilized during weighting may have identified networks not associated with the entity and weighted the IP addresses associated with such networks lower than other IP addresses. As another example, the machine learning algorithm may have detected IP addresses not having access to data internal to the entity and assigned lower weights to those IP addresses.

The scorecard system 200 may also determine the IP addresses to be excluded from the IP mapping during creation of an IP mapping without user input. For example, in one embodiment, IP addresses associated with security providers, such as CloudFlare and Akamai, may be excluded from the created IP mapping because they are associated with the security provider and not the entity. To identify IP addresses associated with security providers and IP addresses behind the security provider that are associated with an entity, the scorecard system 200 may utilize IP address collection module 219C to collect IP address information from unusual data sources. For example, the scorecard system 200 may collect IP address information from alternative domain data sources which may not be configured properly. As another example, the scorecard system 200 may collect and analyze data transmission headers associated with the security providers. In yet another example, the scorecard system 200 may read IP addresses from TCP port 80. In another embodiment, the scorecard system 200 may collect the IP address information directly from the security provider.

The scorecard system 200 may also determine IP addresses to be excluded from the created IP mapping by determining whether the collected IP addresses are associated with a WiFi or guest network provided by the entity. In some embodiments, the entity may provide the scorecard system 200 with the WiFi or guest networks provided by the entity. In other embodiments, the scorecard system may determine the networks during execution of the IP address collection module 219C by collecting data for data sources that specify WiFi and guest networks available by the entity. The scorecard system 200 may also perform an Nmap banner grab during IP address collection to identify whether the IP address is associated with a guest network of the entity.

The IP mapping created with IP mapping creation module 219E may be associated with a subnetwork of an entity's network because some entities, such as network hosting entities, may have multiple networks. In one embodiment, the desired IP addresses to be associated with the entity may be only those IP addresses associated with the entity's network. In another embodiment, the desired IP addresses to be associated with the entity may be the IP addresses that are hosted for other entities. The scorecard system 200 may create the different IP mappings based on a variety of factors. For example, the scorecard system 200 may be provided with information by the entity which specifies which collected IP addresses should be associated with the entity's network and which IP addresses should be associated with the entity's hosting network. In another embodiment, the scorecard system 200 may look at whether a collected IP address is associated with a hosted virtual machine to determine in which IP mapping the IP address should be placed. In other embodiments, the scorecard system 200 may use the machine learning algorithm utilized while executing weighting module 219D to identify factors that may indicate that an IP address is associated with a hosted IP address as opposed to an IP address of the network. The machine learning algorithm may develop the factors and incorporate them into the algorithm to further weigh the IP addresses.

The schematic flow chart diagram of FIG. 3 is generally set forth as a logical flow chart diagram. As such, the depicted order and labeled steps are indicative of aspects of the disclosed method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagram, they are understood not to limit the scope of the corresponding method. Indeed, some arrows or other connectors can be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
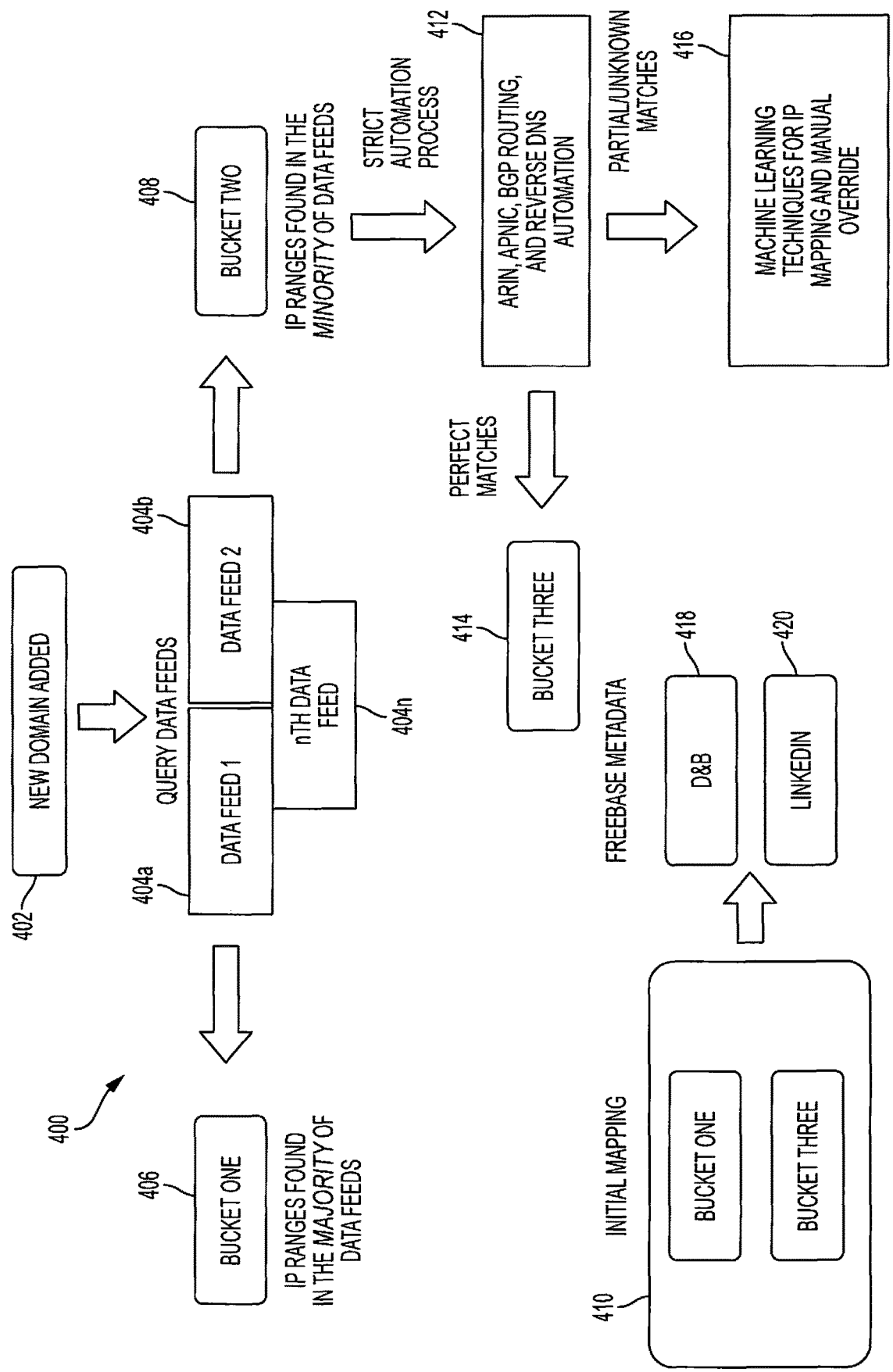
FIG. 4 is a flow diagram illustrating IP mapping with respect to one or more entities according to an embodiment.

FIG. 4 is a flow diagram illustrating IP mapping implemented by scorecard system 200 according to an embodiment of the disclosure. It is noted that embodiments of flow 400 can be implemented with the systems described with respect to FIGS. 1-2, in particular the underlying components illustrated in FIG. 2B. For example, a processor disclosed in flow 400 may correspond to a processor within a scorecard server disclosed in this disclosure. Referring to flow 400, at block 402, scorecard system 200 receives a new domain associated with an entity. For example, scorecard system 200 can implement reception module 219A to receive a URL associated with an entity.

At blocks 404a-404c, flow 400 includes queries 404a-404c of data feeds to determine the different variations of the received domain name and to identify the IP addresses pointed to by the domain name data in the data feeds. Data feeds may correspond to one or more data sources, such as one or more of data sources 150 illustrated in FIG. 1. In some embodiments, to implement queries 404a-404c, scorecard system 200 can implement domain name variations module 219B and/or IP address collection module 219C. In some embodiments, scorecard system 200 may implement at least one of queries 404a-404c by collecting data from one or more data sources and then implementing together the functions of domain name variations module 219B and IP address collection module 219C described above. In another embodiment, scorecard system 200 may implement at least one of queries 404a-404c by implementing domain variations module 219B before implementing IP collection module 219C. In yet another embodiment, scorecard system 200 may implement at least one of queries 404a-404c by implementing IP collection module 219C before implementing domain name variations module 219B.

After performing queries 404a-404c, scorecard system 200 may perform further analysis of the identified IP addresses to create an IP mapping for the entity. For example, in one embodiment, scorecard system 200 may implement weighting module 219D to weigh the identified IP addresses and IP mapping creation module 219E to create the IP mapping based at least on the weighting of the IP addresses. Based on the further analysis performed by implementing the functions of weighting module 219D and IP mapping creation module 219E, scorecard system 200 may create the IP mapping for an entity. For example, in one embodiment, the results of the further analysis may identify which IP addresses can be reliably included in the IP mapping for the entity and which IP addresses require additional analysis to determine whether the IP addresses should be included in the IP mapping for the entity or excluded from the IP mapping for the entity.

As noted with respect to FIG. 3, the scorecard system 200 may identify which IP addresses are most reliably associated with the entity based on a weight threshold. For example, in one embodiment, the scorecard system 200 may set a minimum weight threshold for IP addresses to be included in the created IP mapping. IP addresses with weights higher than the minimum threshold, for example IP addresses pointed to by domain name variations mentioned in numerous databases in association with the company or specifically provided by an employee of the company, may be indicated as reliably associated with the entity. In addition, IP addresses found in the majority of data feeds/sources may also be identified as reliably associated with the entity. In contrast, IP addresses with weights below the minimum threshold, for example IP addresses pointed to by unreliable domain name variations, may be indicated as not reliably associated with the entity. In addition, IP addresses not found in the majority of data feeds/sources may be indicated as not reliably associated with the entity.

As indicated in flow 400, IP addresses indicated as reliably associated with the entity may be grouped together, for example in bucket one 406. IP addresses in bucket one 406 may be automatically included in the entity's initial IP mapping 410. In contrast, the IP addresses indicated as not initially being associated with the entity may be grouped together in a separate group, for example in bucket two 408, to undergo further processing, as indicated in further processing block 412 in flow 400.

In some embodiments, further processing 412 performed on IP addresses grouped into bucket two 408 may include implementation of various aspects of IP address collection module 219C, weighting module 219D, and IP mapping creation module 219E, as described in blocks 306, 308, and 310 of method 300, respectively. For example, further processing 412 may include implementing IP collection module 219C to collect IP specific information from IP specific data sources, such as ARIN, RIPE, LACNIC, AFRINIC, and APNIC. In addition, further processing may include analyzing data in DNS records, such as performing reverse DNS automation, and analyzing data in BGP records, SSL certificates, security scanners, such as Nmap, CDN databases, and known security IP addresses, such as honeypots and sinkholes owned by security companies.

Scorecard system 200 may identify further IP addresses to include in the initial IP mapping 410 based on the further processing 412 performed on the IP addresses in bucket two 408. For example, scorecard system 200 may identify IP addresses matching perfectly to an IP address associated with the entity as indicated by the IP addresses collected for the entity during the performance of further processing 412. As an example, scorecard system 200 may group together the IP addresses matching perfectly into bucket three 414 and include the IP addresses in the initial IP mapping 410.

In other embodiments, those IP addresses that were not identified during further processing 412 as matching perfectly to an IP address known to be associated with the entity based on the IP addresses collected using IP address collection module 219C may undergo additional processing, such as at processing block 416. The processing performed on IP addresses at block 416 may include implementation of various aspects of IP address collection module 219C, weighting module 219D, and IP mapping creation module 219E, as described in blocks 306, 308, and 310 of method 300, respectively. For example, the processing at block 416 may include implementation of machine learning, such as the machine learning processing disclosed in the discussion regarding weighting module 219D and block 308.

In some embodiments, the IP addresses placed in the initial mapping 410 may be verified as being associated with the entity through analysis of information provided for the entity on data sources, such as Freebase databases 418 and social media websites, for example LinkedIn 420. In some embodiments, the initial IP mapping 410, either before or after the optional aforementioned verification processing, may be identified as the final IP mapping created for an entity, such as the final IP mapping created for an entity at block 310 of FIG. 3.

If implemented in firmware and/or software, the functions described above can be stored as one or more instructions or code on a computer-readable medium. Examples include non-transitory computer-readable media encoded with a data structure and computer-readable media encoded with a computer program. Computer-readable media includes physical computer storage media. A storage medium can be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer-readable medium, instructions and/or data can be provided as signals on transmission media included in a communication apparatus. For example, a communication apparatus includes a transceiver having signals indicative of instructions and data. The instructions and data can be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein can be utilized according to the present disclosure. Accordingly, the appended claims are intended to include within their scope such processes, machines, manufacture, compositions of matter, means, methods, or steps.

What is claimed is:

1. A method for mapping Internet Protocol (IP) addresses to an entity, the method comprising:
   receiving, by one or more processors, one or more domain names associated with the entity;
   identifying, by the one or more processors, one or more variations of the one or more domain names based on analysis of domain name data collected from one or more domain name data sources;
   identifying, by the one or more processors, one or more IP addresses pointed to by the identified one or more variations of the one or more domain names based on analysis of IP address data collected from one or more IP address data sources; and mapping at least one of the identified one or more IP addresses to the entity based on a correlation between the identified one or more IP addresses and the identified one or more variations of the one or more domain names, wherein the correlation is based, at least in part, on a reliability weighting of the one or more variations of the one or more domain names.

2. The method of claim 1 wherein the identifying one or more IP addresses comprises collecting the one or more IP addresses that map to the one or more variations of the one or more domain names.

3. The method of claim 1 wherein the correlation is determined by steps comprising:
assigning a larger weight to an IP address of the identified one or more IP addresses that relates to a first number of the one or more variations of the one or more domain names; and
assigning a smaller weight to an IP address of the identified one or more IP addresses that relates to a second number of the one or more variations of the one or more domain names,
wherein the first number is larger than the second number.

4. The method of claim 1 further comprising:
updating the mapping based on user input.

5. The method of claim 1 further comprising:
re-mapping at least one of the identified one or more IP addresses to the entity based on an updated correlation between the identified one or more IP addresses and the identified one or more variations of the one or more domain names.

6. The method of claim 1 further comprising:
associating IP addresses with networks other than the entity's network based on at least one of user input and detection of IP addresses not having access to data internal to the entity.

7. The method of claim 6 wherein the networks other than the entity's network comprise at least one of a Wi-Fi, third-party hosting, guest network, or security network.

8. A non-transitory computer-readable medium comprising instructions that are executable and when executed cause a computing system to map Internet Protocol (IP) addresses to an entity by:
receiving, by one or more processors, one or more domain names associated with the entity;
identifying, by the one or more processors, one or more variations of the one or more domain names based on analysis of domain name data collected from one or more domain name data sources;
identifying, by the one or more processors, one or more IP addresses pointed to by the identified one or more variations of the one or more domain names based on analysis of IP address data collected from one or more IP address data sources; and
mapping at least one of the identified one or more IP addresses to the entity based on a correlation between the identified one or more IP addresses and the identified one or more variations of the one or more domain names, wherein the correlation is based, at least in part, on a reliability weighting of the one or more variations of the one or more domain names.

9. The non-transitory computer-readable medium of claim 8
wherein the identifying one or more IP addresses comprises collecting the one or more IP addresses that map to the one or more variations of the one or more domain names.

10. The non-transitory computer-readable medium of claim 8 wherein the correlation is determined by steps comprising:
assigning a larger weight to an IP address of the identified one or more IP addresses that relates to a first number of the one or more variations of the one or more domain names; and
assigning a smaller weight to an IP address of the identified one or more IP addresses that relates to a second number of the one or more variations of the one or more domain names,
wherein the first number is larger than the second number.

11. The non-transitory computer-readable medium of claim 10 further comprising the instructions that, when executed, cause the computing system to map the IP addresses to the entity by:
associating IP addresses with networks other than the entity's network based on at least one of user input and detection of IP addresses not having access to data internal to the entity.

12. The non-transitory computer-readable medium of claim 11 where the networks other than the entity's network comprise at least one of a Wi-Fi, third-party hosting, guest network, or security network.

13. The non-transitory computer-readable medium of claim 8 further comprising the instructions that, when executed, cause the computing system to map the IP addresses to the entity by updating the mapping based on user input.

14. The non-transitory computer-readable medium of claim 8 further comprising the instructions that, when executed, cause the computing system to map the IP addresses to the entity by:
mapping at least one of the identified one or more IP addresses to the entity based on an updated correlation between the identified one or more IP addresses and the one or more variations of the one or more domain names.

15. An apparatus that maps Internet Protocol (IP) addresses to an entity, the apparatus comprising:
one or more processors; and
a non-transitory computer-readable memory communicatively coupled to the one or more processors and containing program code configured to cause the one or more processors to perform operations including:
receiving, by one or more processors, one or more domain names associated with the entity;
identifying, by the one or more processors, one or more variations of the one or more domain names based on analysis of domain name data collected from one or more domain name data sources;
identifying, by the one or more processors, one or more IP addresses pointed to by the identified one or more variations of the one or more domain names based on analysis of IP address data collected from one or more IP address data sources; and
mapping at least one of the identified one or more IP addresses to the entity based on a correlation between the identified one or more IP addresses and the identified one or more variations of the one or more domain names, wherein the correlation is based, at least in part, on a reliability weighting of the one or more variations of the one or more domain names.

16. The apparatus of claim 15 wherein the identifying one or more IP addresses comprises collecting the one or more IP addresses that map to the one or more variations of the one or more domain names.

17. The apparatus of claim 15 wherein the correlation is determined by:
   assigning a larger weight to an IP address of the identified one or more IP addresses that relates to a first number of the one or more variations of the one or more domain names; and
   assigning a smaller weight to an IP address of the identified one or more IP addresses that relates to a second number of the one or more variations of the one or more domain names,
   where the first number is larger than the second number.

18. The apparatus of claim 15 where the one or more processors is further configured to perform updating the mapping based on user input.

19. The apparatus of claim 15 wherein the one or more processors is further configured to perform re-mapping at least one of the identified one or more IP addresses to the entity based on an updated correlation between the identified one or more IP addresses and the identified one or more variations of the one or more domain names.

20. The apparatus of claim 15 wherein the one or more processors is further configured to perform associating IP addresses with networks other than the entity's network based on at least one of user input and detection of IP addresses not having access to data internal to the entity.

* * * * *